United States Patent
Ambe et al.

(10) Patent No.: US 12,264,701 B2
(45) Date of Patent: Apr. 1, 2025

(54) ATTACHMENT PORTION, DEVICE FOR VEHICLE, AND ATTACHMENT METHOD

(71) Applicant: YOKOWO CO., LTD., Tokyo (JP)

(72) Inventors: Tomio Ambe, Tomioka (JP); Ryota Tamai, Tomioka (JP)

(73) Assignee: YOKOWO CO., LTD., Tokyo (JP)

( * ) Notice: Subject to any disclaimer, the term of this patent is extended or adjusted under 35 U.S.C. 154(b) by 101 days.

(21) Appl. No.: 17/911,420

(22) PCT Filed: Feb. 17, 2021

(86) PCT No.: PCT/JP2021/005831
§ 371 (c)(1),
(2) Date: Sep. 14, 2022

(87) PCT Pub. No.: WO2021/192740
PCT Pub. Date: Sep. 30, 2021

(65) Prior Publication Data
US 2023/0106963 A1 Apr. 6, 2023

(30) Foreign Application Priority Data
Mar. 26, 2020 (JP) .................. 2020-055354

(51) Int. Cl.
*F16B 5/02* (2006.01)
*F16B 37/04* (2006.01)

(52) U.S. Cl.
CPC ............ *F16B 5/02* (2013.01); *F16B 37/043* (2013.01)

(58) Field of Classification Search
CPC ........ F16B 5/0004; F16B 5/02; F16B 5/0208; F16B 37/04; F16B 37/041; F16B 37/043;
(Continued)

(56) References Cited

U.S. PATENT DOCUMENTS 3,180,387 A * 4/1965 Dzus ............... F16B 5/0208
411/968
3,579,942 A * 5/1971 Cole ................ F16B 5/01
428/116

(Continued)

FOREIGN PATENT DOCUMENTS

JP 57-68807 A 4/1982
JP 10-25715 A 1/1998
(Continued)

OTHER PUBLICATIONS

International Search Report and Written Opinion mailed on May 11, 2020, received for PCT Application PCT/JP2021/005831, filed on Feb. 17, 2021, 14 pages including English Translation.
(Continued)

*Primary Examiner* — Roberta S Delisle
(74) *Attorney, Agent, or Firm* — XSENSUS LLP

(57) ABSTRACT

An attachment portion facilitates attachment to an attachment object such as a vehicle. The attachment portion includes a first fastening portion, a second fastening portion to be screwed with the first fastening portion, a detent portion (a connection portion, a holder) provided between the first fastening portion and the second fastening portion, and a deformable member (a claw washer) provided between the first fastening portion and the detent portion. The detent portion suppresses that at least one of the first fastening portion and the deformable member rotate(s) when the second fastening portion rotates. After the first fastening portion and the deformable member are inserted into an attachment hole into which the attachment portion is to be inserted, of the attachment object, the deformable member sandwiches the attachment object with the second fastening portion by rotating the second fastening portion so as to be screwed with the first fastening portion.

11 Claims, 15 Drawing Sheets

(58) Field of Classification Search
CPC ............ F16B 37/044–045; F16B 39/10; F16B 39/24; F16B 41/002; F16B 43/00; Y10S 411/97; Y10S 411/969
USPC ........ 411/103, 107, 111–113, 116, 136, 337, 411/368, 383
See application file for complete search history.

(56) References Cited

U.S. PATENT DOCUMENTS

| | | | | |
|---|---|---|---|---|
| 5,146,668 | A * | 9/1992 | Gulistan | B21K 1/70 72/356 |
| 6,174,118 | B1 * | 1/2001 | Rebers | F16B 39/14 411/352 |
| 8,702,362 | B2 * | 4/2014 | Zhu | F16B 33/002 411/389 |
| 8,985,924 | B2 * | 3/2015 | Nakamura | B60N 2/36 411/103 |
| 2009/0190993 | A1 * | 7/2009 | De Gelis | F16B 5/0233 403/47 |
| 2017/0175797 | A1 * | 6/2017 | Kawamura | F16B 37/00 |
| 2017/0237156 | A1 | 8/2017 | Taira | |

FOREIGN PATENT DOCUMENTS

| | | |
|---|---|---|
| JP | 2001-323607 A | 11/2001 |
| JP | 2006-57776 A | 3/2006 |
| JP | 2012-28661 A | 2/2012 |
| JP | 2012-47264 A | 3/2012 |
| JP | 2018-17254 A | 2/2018 |
| JP | 2018-131075 A | 8/2018 |
| WO | 2019/228896 A1 | 12/2019 |

OTHER PUBLICATIONS

Notice of Reasons for Refusal mailed on Jan. 6, 2021, received for JP Application 2020-055354, 19 pages Including English Translation.

Notice of Reasons for Refusal mailed on Apr. 23, 2021, received for JP Application 2020-055354, 10 pages including English Translation.

Extended European search report issued on Mar. 26, 2024, in corresponding European patent Application No. 21774619.7, 8 pages.

* cited by examiner

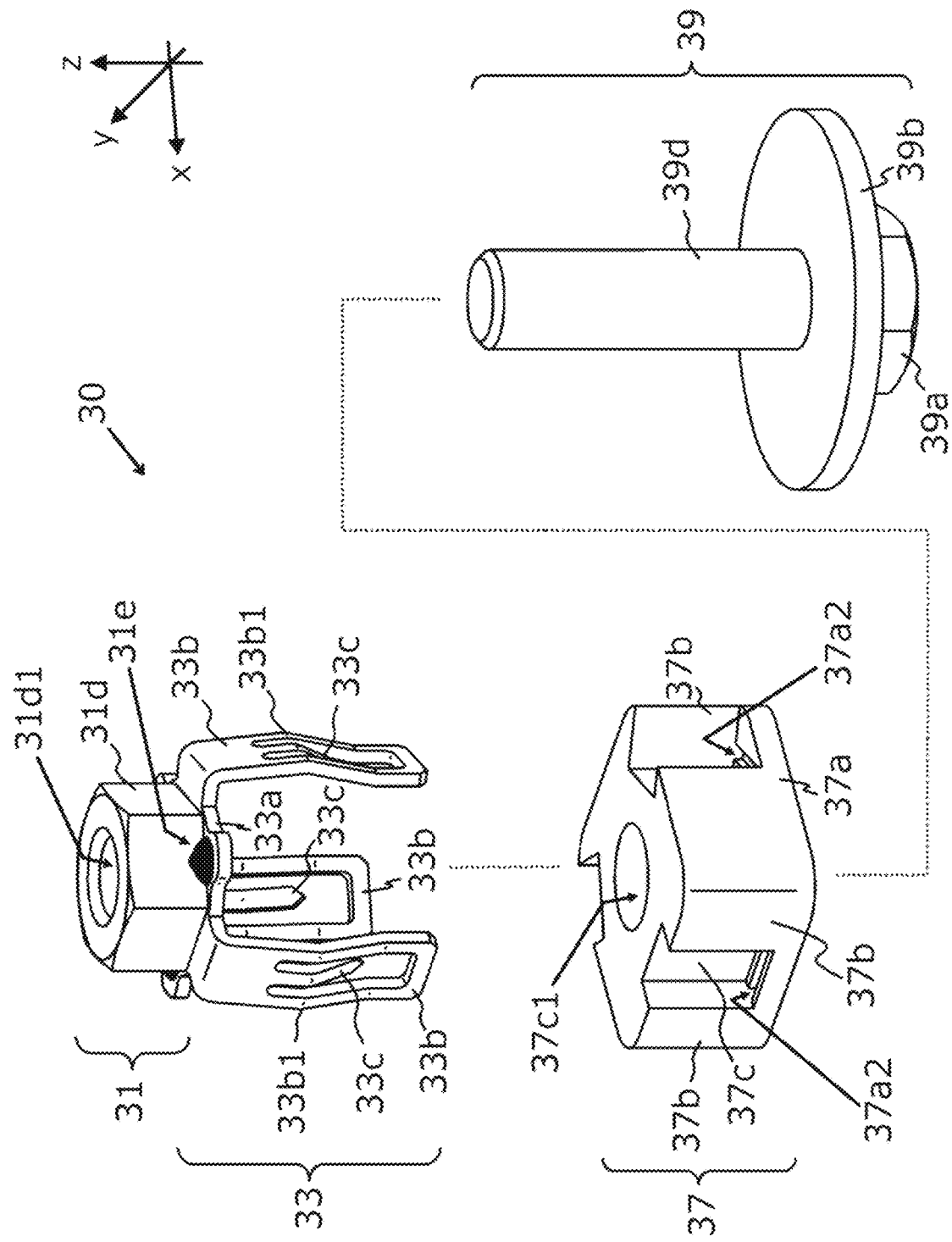

ATTACHMENT PORTION, DEVICE FOR VEHICLE, AND ATTACHMENT METHOD

CROSS-REFERENCE TO RELATED APPLICATIONS

The present application is based on PCT filing PCT/JP2021/005831, filed Feb. 17, 2021, which claims priority to JP 2020-055354, filed Mar. 26, 2020, the entire contents of each are incorporated herein by reference.

TECHNICAL FIELD

The present invention relates to an attachment portion or the like.

BACKGROUND ART

In related art, an antenna attachment device has been proposed as in Patent Literature 1.

CITATION LIST

Patent Literature

Patent Literature 1: JP 2007-177986 A

SUMMARY OF INVENTION

Technical Problem

However, it is necessary to attach a member from both sides of an attachment object such as a vehicle roof.

Thus, an example of an object of the present invention is to facilitate attachment to an attachment object such as a vehicle.

Solution to Problem

An attachment portion according to the present invention includes a first fastening portion, a second fastening portion to be screwed with the first fastening portion, a detent portion provided between the first fastening portion and the second fastening portion, and a deformable member provided between the first fastening portion and the detent portion. The detent portion suppresses that at least one of the first fastening portion and the deformable member rotate(s) when the second fastening portion rotates. After the first fastening portion and the deformable member are inserted into an attachment hole into which the attachment portion is to be inserted, of an attachment object, the deformable member sandwiches the attachment object with the second fastening portion by rotating the second fastening portion so as to be screwed with the first fastening portion.

Advantageous Effects of Invention

As described above, according to the present invention, it is possible to facilitate attachment to an attachment object such as a vehicle.

BRIEF DESCRIPTION OF DRAWINGS

FIG. 15 is an exploded perspective view of an attachment portion of a third embodiment.

DESCRIPTION OF EMBODIMENTS

Hereinafter, a first embodiment will be described with reference to the drawings (see FIG. 1 to FIG. 13).

Note that the embodiment is not limited to the following embodiments. In addition, content described in one embodiment is similarly applied to other embodiments in principle. Further, each embodiment and each modification can be appropriately combined.

(Configuration of Device for Vehicle 1)

Figure 1:
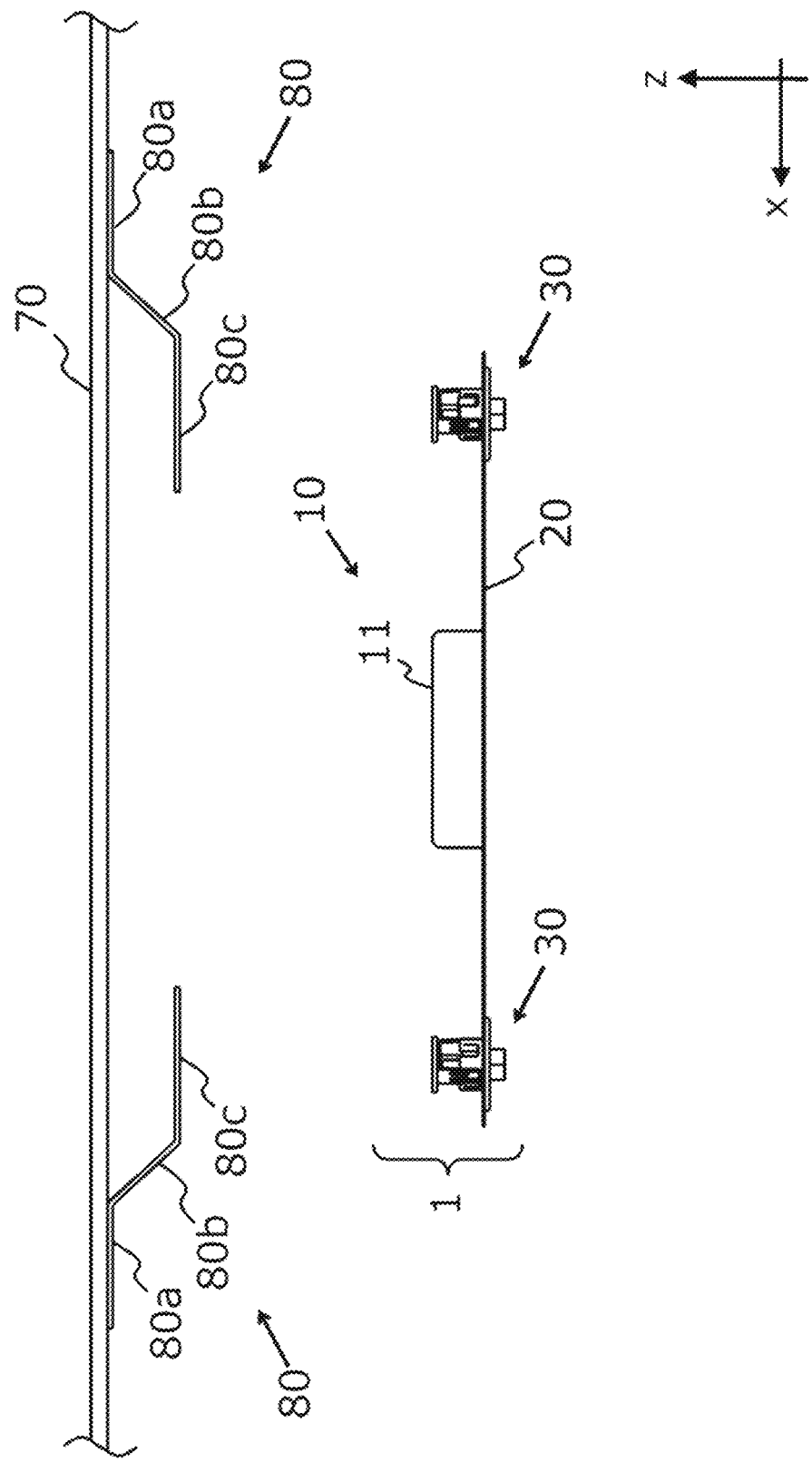
FIG. 1 is a side view of a device for vehicle and a region in which the device for vehicle of a vehicle of a first embodiment is to be attached.
Figure 2:
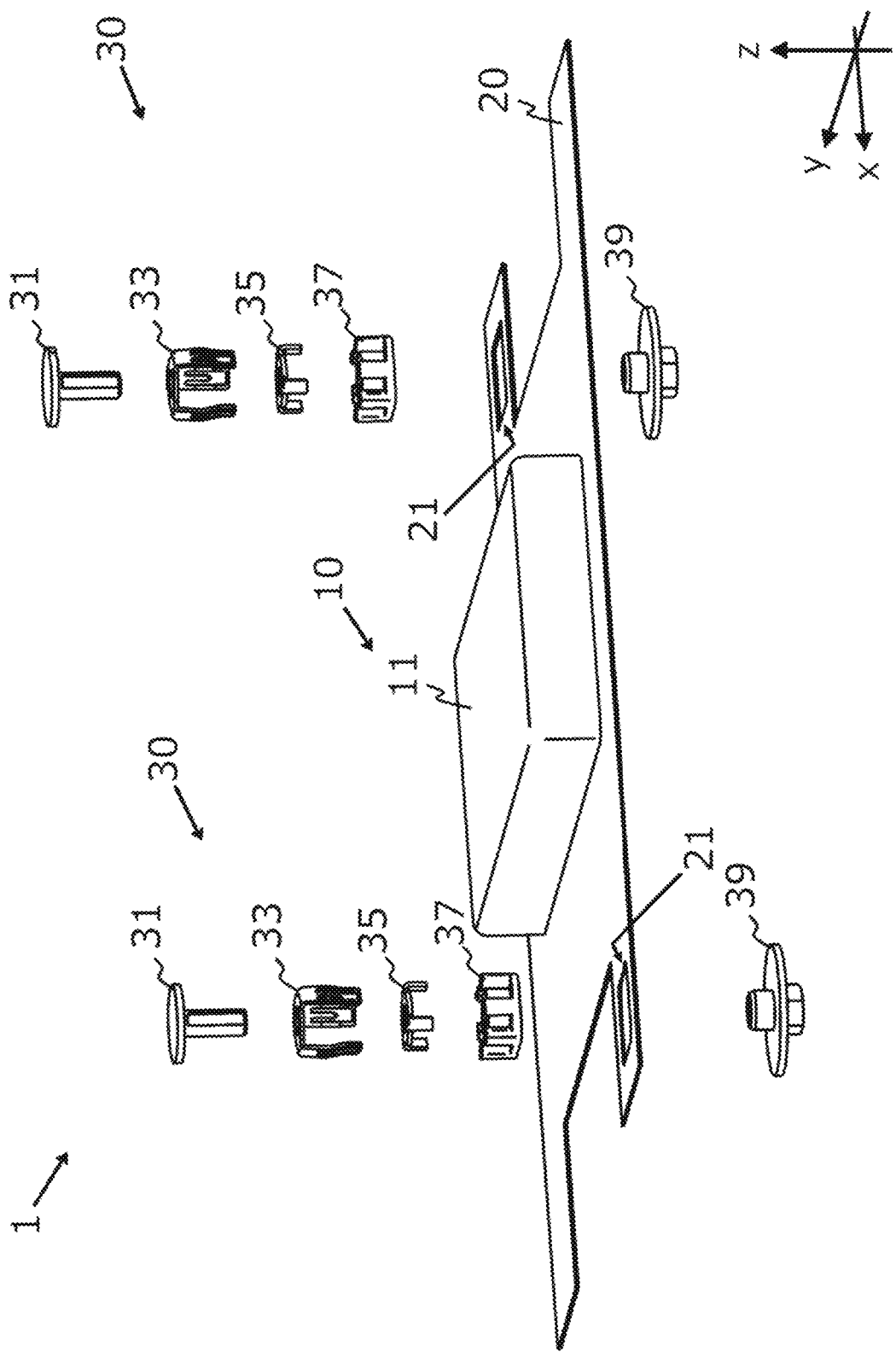
FIG. 2 is a perspective view of the device for vehicle according to the first embodiment including an attachment portion before being assembled.
Figure 3:
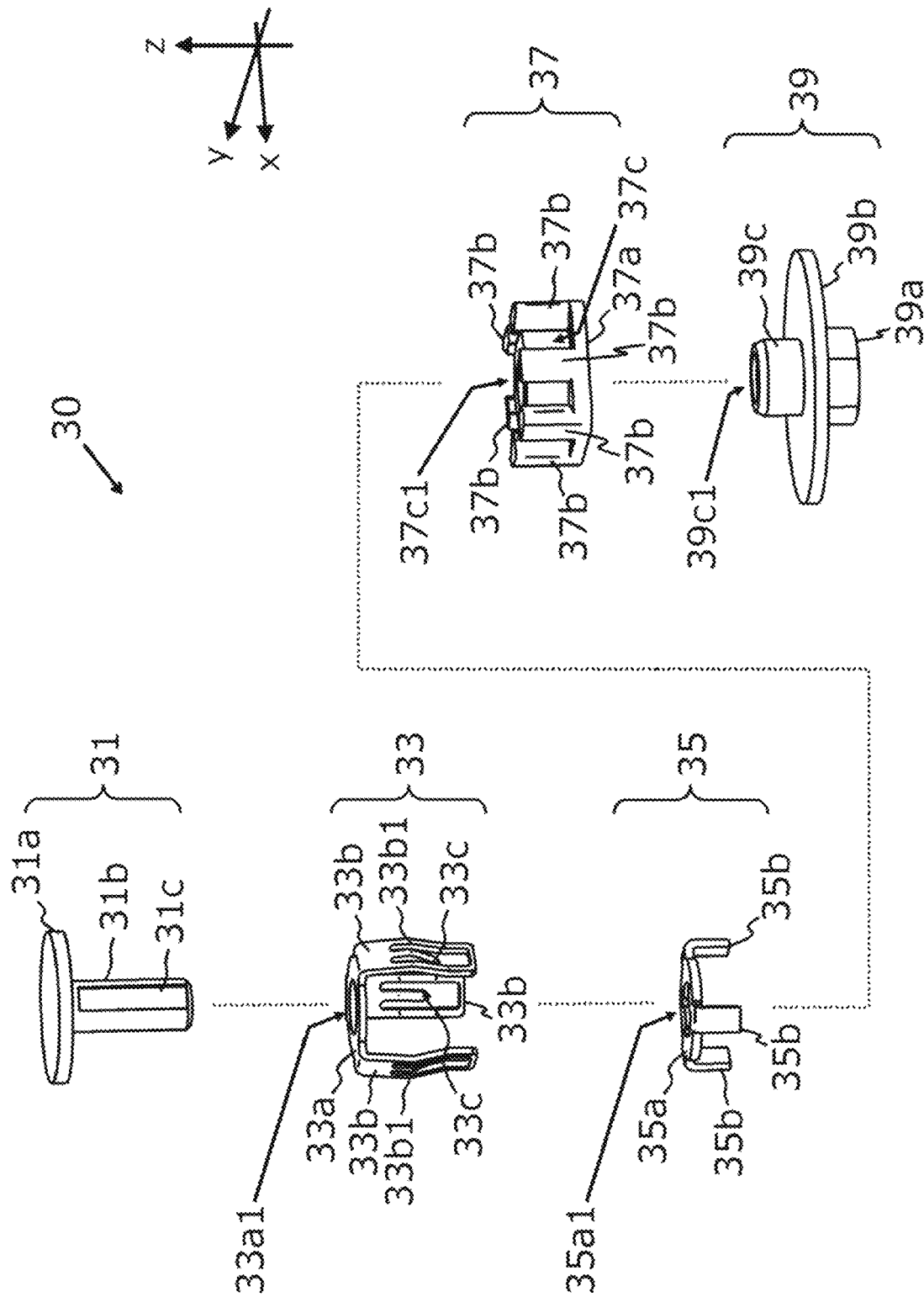
FIG. 3 is an exploded perspective view of the attachment portion of the first embodiment.

A device for vehicle 1 of the first embodiment is an antenna device for vehicle. As illustrated in FIG. 1 and FIG. 2, the device for vehicle 1 includes an electronic equipment 10, a holding plate (an electronic equipment holding portion) 20, and an attachment portion 30. The electronic equipment 10 is held by the holding plate 20. The holding plate 20 is held by a bracket 80 of a vehicle roof 70 via the attachment portion 30.

In order to describe a direction, a front-rear direction of the vehicle to which the device for vehicle 1 is to be attached will be described as an x direction, a left-right direction perpendicular to the x direction will be described as a y direction, and a substantially vertical direction perpendicular to the x direction and the y direction will be described as a z direction.

Figure 4:
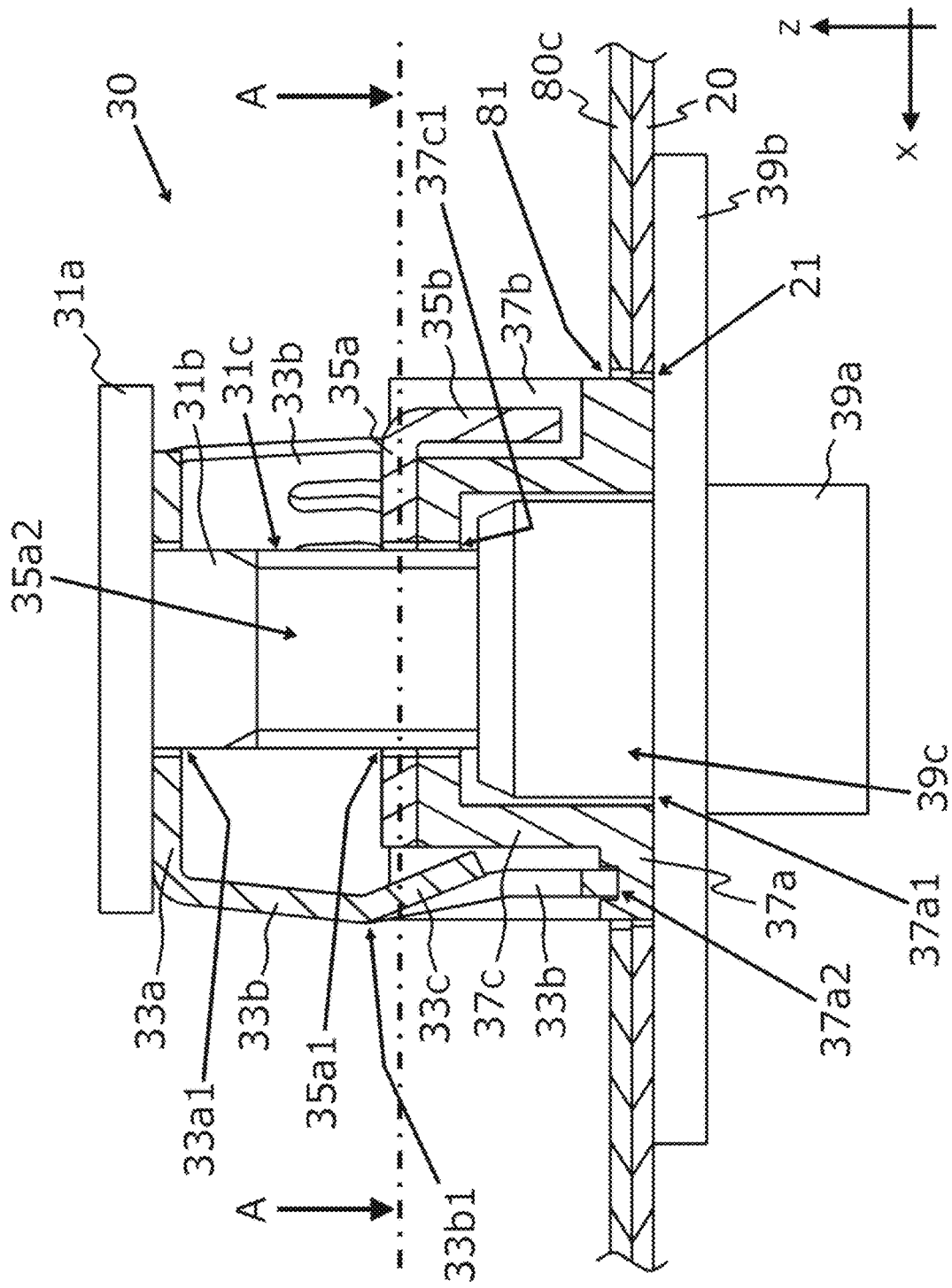
FIG. 4 is a cross-sectional configuration view of a region including the attachment portion in a state in which an insertion step is executed.
Figure 5:
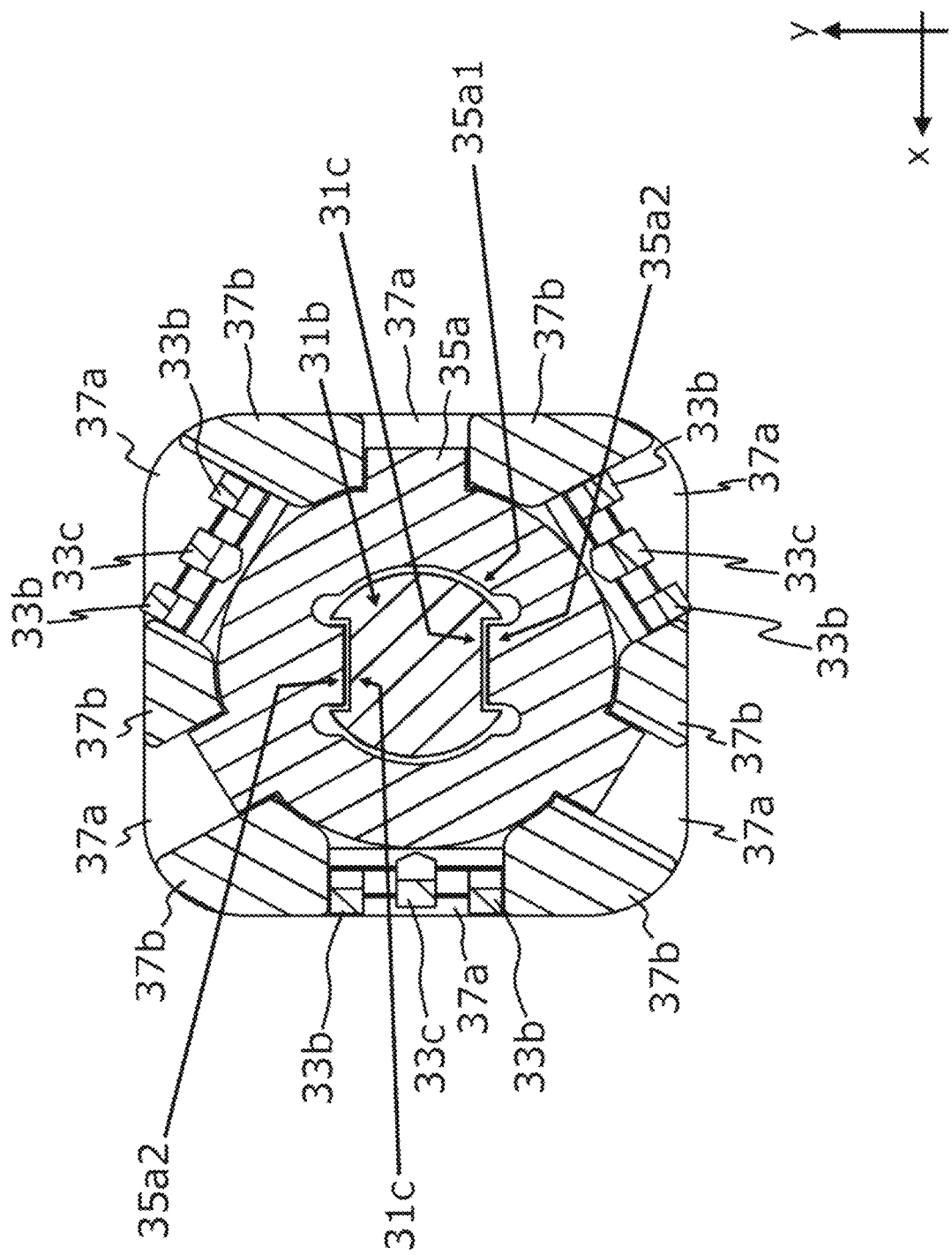
FIG. 5 is a cross-sectional configuration cut along a line A-A of FIG. 4.
Figure 6:
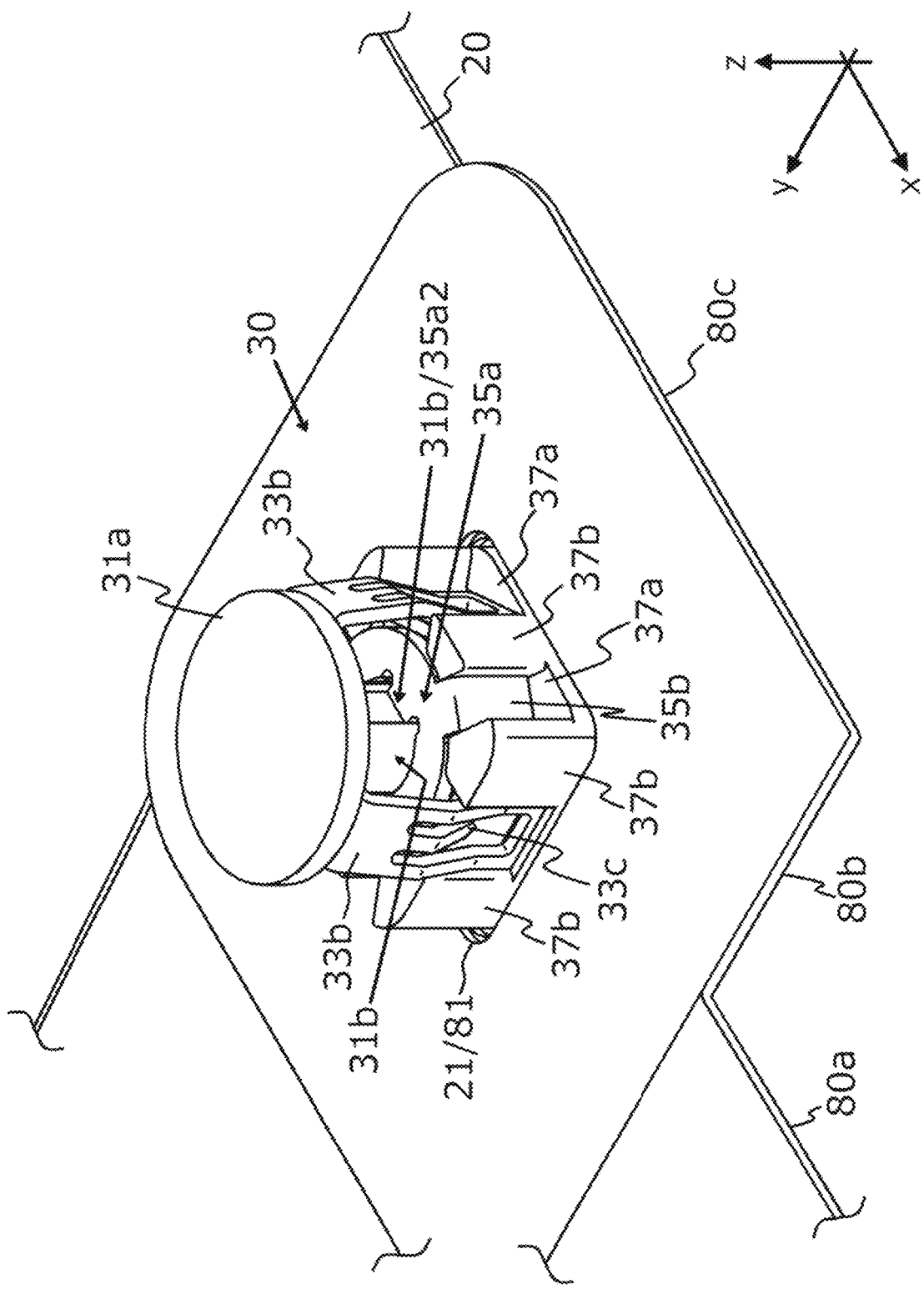
FIG. 6 is a perspective view of the region including the attachment portion in the state in which the insertion step is executed.
Figure 7:
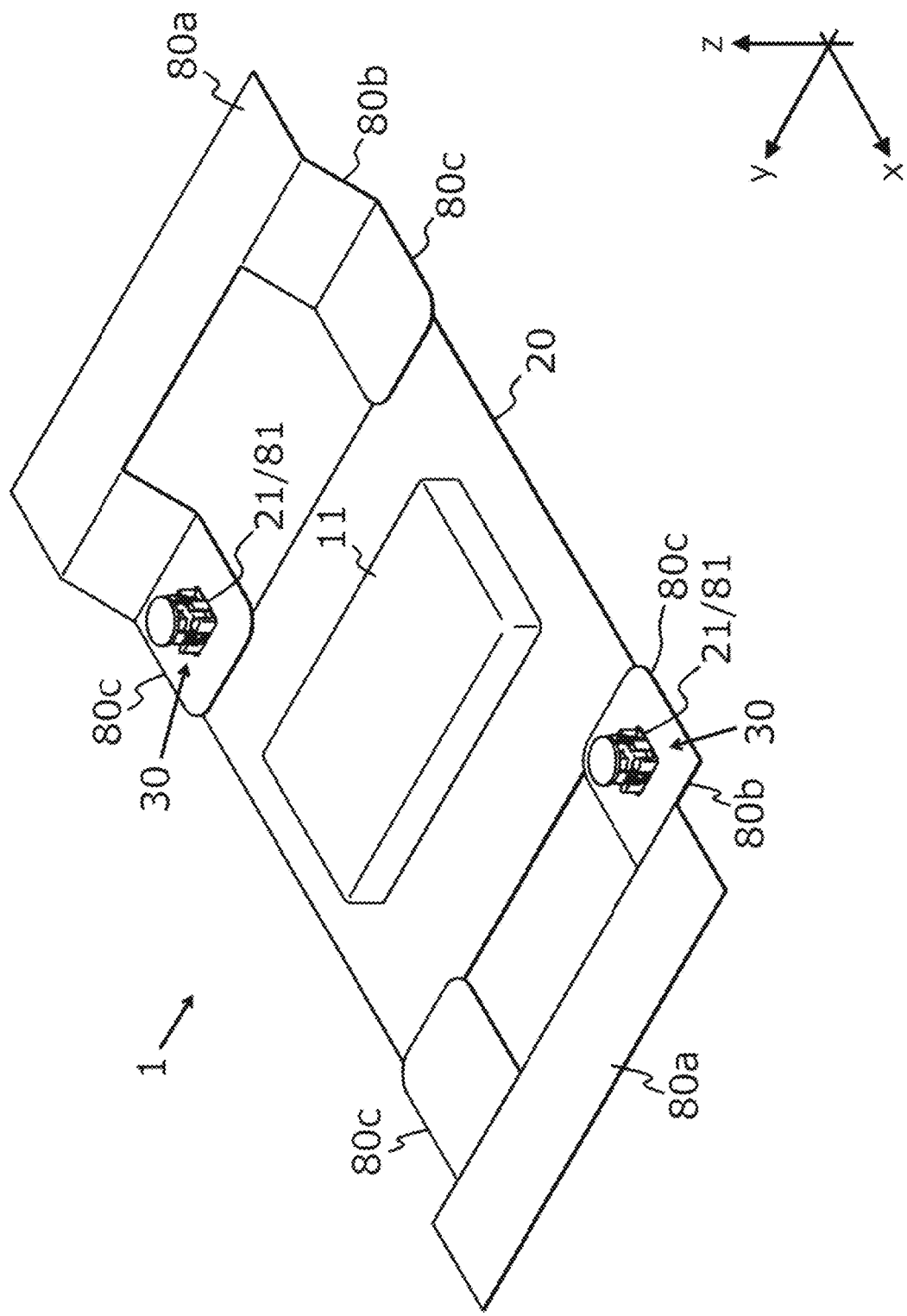
FIG. 7 is a perspective view of a bracket and the device for vehicle in a state in which an insertion step is executed.
Figure 8:
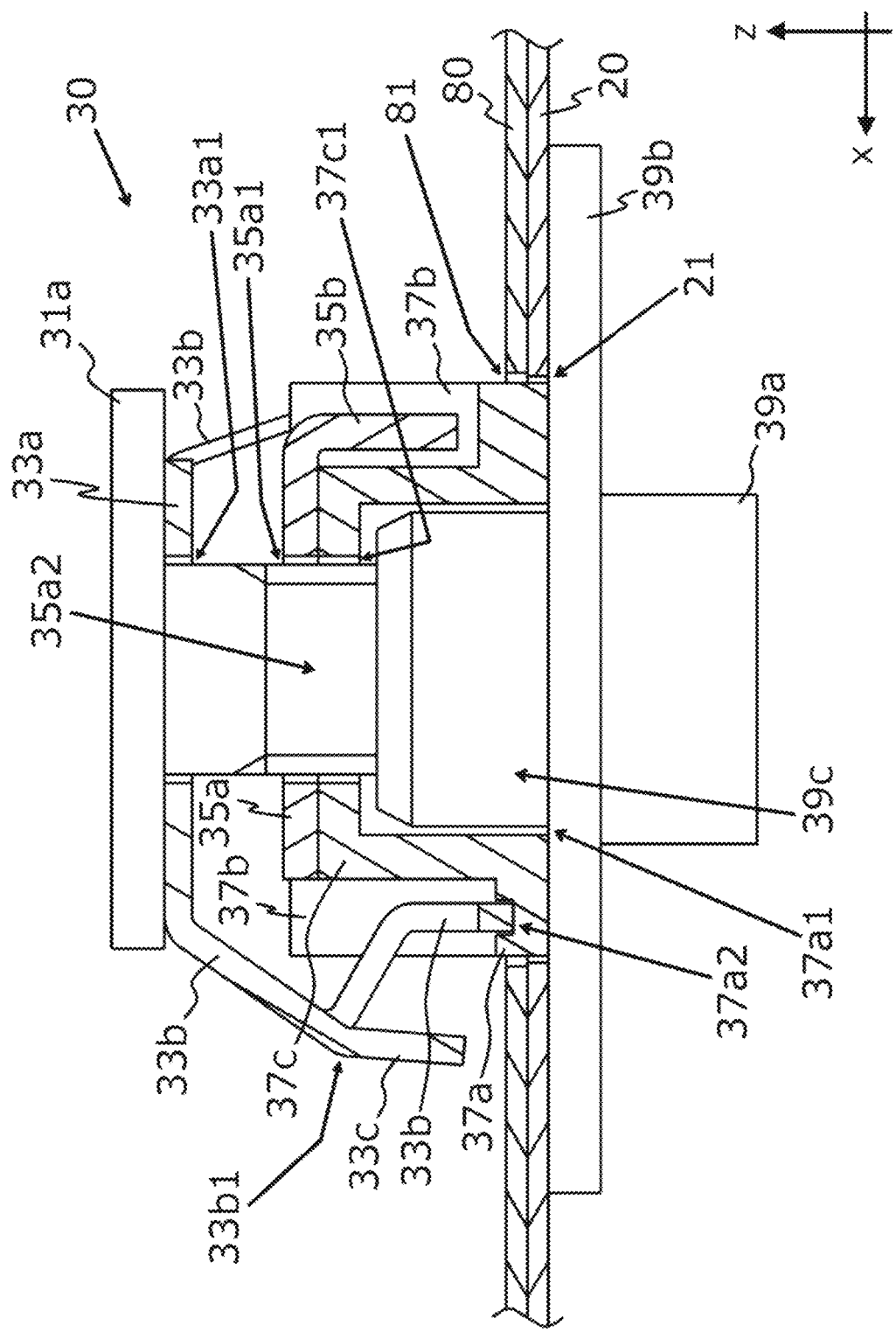
FIG. 8 is a cross-sectional configuration view of the region including the attachment portion in a state in which a first rotation step is executed.
Figure 11:
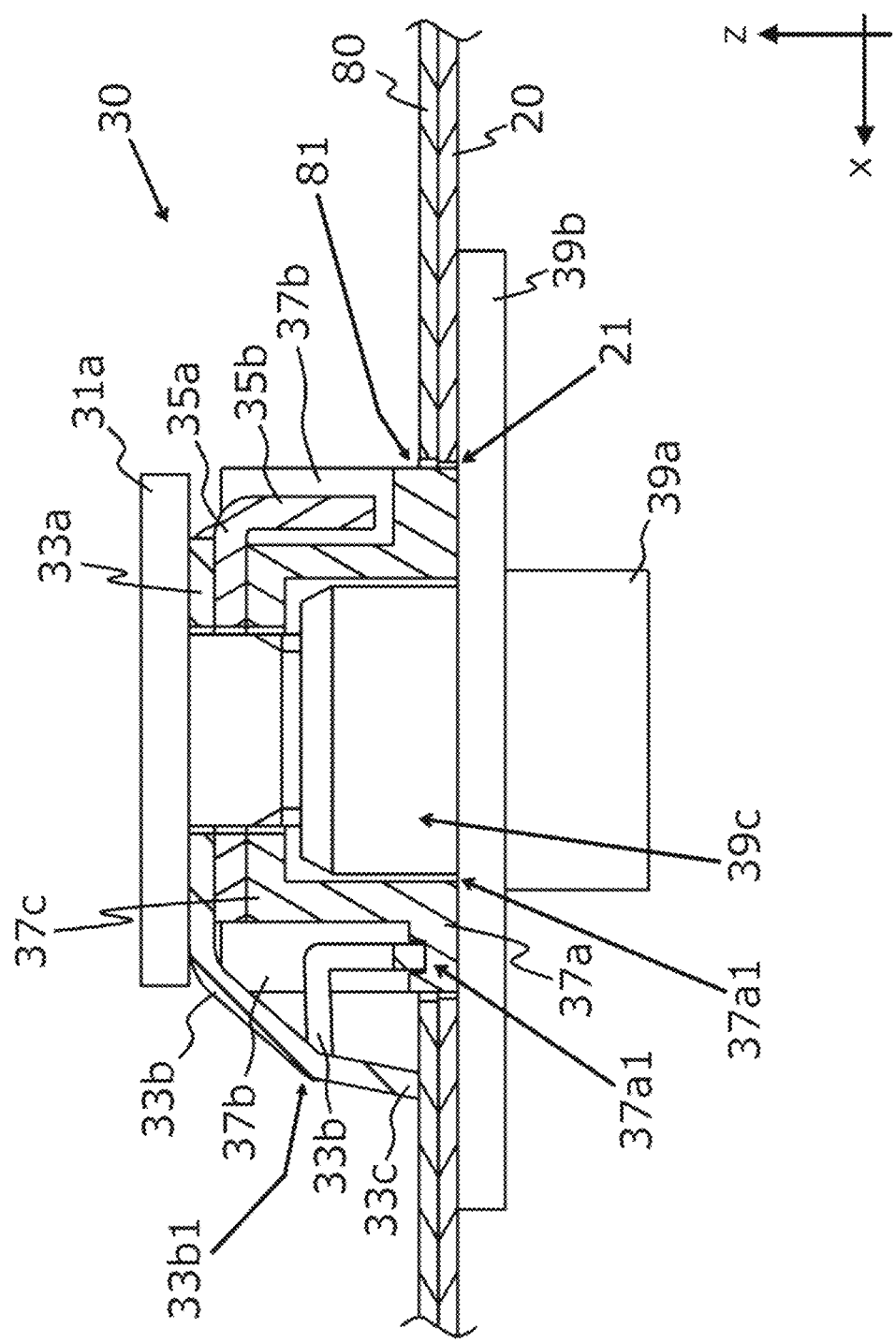
FIG. 11 is a cross-sectional configuration view of the region including the attachment portion in a state in which a second rotation step is executed.

In FIG. 2 or the like, directions indicated by arrows of x, y and z axes are defined as a forward direction, a right direction, and an upward direction, respectively. Note that a cross-sectional configuration views of FIG. 4, FIG. 8, and FIG. 11 illustrate a side surface of a member constituting a first fastening portion 31 such as a head portion 31a and a member constituting a second fastening portion 39 such as a grip portion 39a, a cross-section of the holding plate 20, a member constituting a claw washer 33 such as a first flat portion 33a, a member constituting a connection portion 35 such as a second flat portion 35a, a member constituting a holder 37 such as a third flat portion 37a, and a member constituting the bracket 80 such as an in-vehicle antenna device contact portion 80c.

(Electronic Equipment 10)

The electronic equipment 10 is an antenna unit of the antenna device for vehicle. The electronic equipment 10 includes a case 11. Between the case 11 and the holding plate 20, electronic components such as an antenna element and a substrate for the electronic equipment 10 to function as an antenna are provided (not illustrated).

(Holding Plate 20)

The holding plate 20 is constituted with a metal plate and is electrically connected to a substrate of the electronic equipment 10 for grounding. The holding plate 20 includes a first attachment hole 21. The first attachment hole 21 is provided at a position facing a second attachment hole 81 which will be described later, in the z direction, when the device for vehicle 1 is attached to the bracket 80.

(Shape of First Attachment Hole 21)

The xy cross-section of the first attachment hole 21 has a cross-sectional shape other than a perfect circle, such as a polygon and an ellipse so that the third flat portion 37a fitted into the first attachment hole 21 does not rotate around an axis parallel to the z direction.

In the first embodiment, an example will be described in which the xy cross-section of the first attachment hole 21 has a quadrangular shape.

(Attachment Portion 30)

As illustrated in FIG. 3 to FIG. 6, the attachment portion 30 includes the first fastening portion 31, the claw washer (deformable member) 33, the connection portion 35, the holder 37, and the second fastening portion 39. The connection portion 35 and the holder 37 function as a detent portion that suppresses rotation of at least one of the first fastening portion 31 and the claw washer 33 when the second fastening portion 39 rotates.

(First Fastening Portion 31)

The first fastening portion 31 is a bolt and includes the head portion 31a and a first shaft portion 31b. The first shaft portion 31b is provided with a region (a first engagement portion 31c) recessed from the side surface of the first shaft portion 31b. The first engagement portion 31c is formed such that any of the regions in the z direction where the first engagement portion 31c of the first shaft portion 31b is provided is engaged with a second engagement portion 35a2 of a second flat portion hole 35a1 of the second flat portion 35a of the connection portion 35 at the time of screwing. Specifically, the first engagement portion 31c is constituted with a recess having a substantially rectangular parallelepiped shape extending in the z direction. In the first embodiment, two first engagement portions 31c are provided so as to face each other in the y direction. However, only one first engagement portion 31c may be provided, or three or more first engagement portions 31c may be provided.

(Claw Washer 33)

The claw washer 33 includes the first flat portion 33a, a first leg portion 33b, and a claw portion 33c.

The first flat portion 33a has a substantially disk shape and has a first flat portion hole 33a1 in the vicinity of the center.

The first flat portion hole 33a1 is constituted with a round hole through which the first shaft portion 31b of the first fastening portion 31 passes. An upper surface of the first flat portion 33a faces a lower surface of the head portion 31a of the first fastening portion 31 at the time of assembling the attachment portion 30.

The first leg portion 33b extends downward in the z direction from a peripheral portion of the first flat portion 33a.

In the first embodiment, three first leg portions 33b are provided at equal intervals in the peripheral portion of the first flat portion 33a when viewed from the z direction. A lower end of the first leg portion 33b is inserted into a recess (a leg receiving portion 37a2) provided on an upper surface of the third flat portion 37a of the holder 37 at the time of assembling the attachment portion 30.

When a force for vertically sandwiching the first leg portion 33b is applied, the first leg portion 33b is deformed so as to be bent outward in a radial direction of the first shaft portion 31b at a bent portion 33b1 in the vicinity of the center in the z direction.

The claw portion 33c extends downward in the z direction from an upper portion of the first leg portion 33b. When the first leg portion 33b is bent at the bent portion 33b1, the claw portion 33c does not bend from the upper portion of the first leg portion 33b and protrudes radially outward of the first shaft portion 31b, and a lower end portion of the claw portion 33c bites into an upper surface of the bracket 80.

(Connection Portion 35)

The connection portion 35 includes the second flat portion 35a and a second leg portion 35b.

The second flat portion 35a has a substantially disk shape and has the second flat portion hole 35a1 in the vicinity of the center. The second flat portion hole 35a1 is penetrated by the first shaft portion 31b of the first fastening portion 31 and is engaged with the first engagement portion 31c of the first fastening portion 31, at the time of assembling the attachment portion 30. Thus, the second flat portion hole 35a1 has a shape in which the second engagement portion 35a2 is provided in the round hole. In the first embodiment, two second engagement portions 35a2 are provided so as to face each other in the y direction in accordance with the first engagement portion 31c.

The second leg portion 35b extends downward in the z direction from the peripheral portion of the second flat portion 35a. In the first embodiment, three second leg portions 35b are provided at equal intervals in the peripheral portion of the second flat portion 35a when viewed from the z direction. Further, at the time of assembling the attachment portion 30, the second leg portion 35b is disposed so as to be positioned between two adjacent first leg portions 33b as viewed from the z direction.

(Holder 37)

The holder 37 has the third flat portion 37a, a third leg portion 37b, and a protruding portion 37c. The holder 37 holds the claw washer 33 and the connection portion 35.

The third flat portion 37a has a substantially quadrangular plate shape and is fitted into the first attachment hole 21 and the second attachment hole 81 when the device for vehicle 1 is attached to the bracket 80. The xy cross-section of the third flat portion 37a has substantially the same size and substantially the same outer shape as the xy cross-section of an inner wall of the first attachment hole 21 and the second attachment hole 81 which will be described later.

A third flat portion hole 37a1 is provided in the vicinity of the center of the third flat portion 37a.

A first bearing portion 39c of the second fastening portion 39 which will be described later is inserted into the third flat portion hole 37a1.

The third leg portion 37b extends upward in the z direction from the peripheral portion of the third flat portion 37a. In the first embodiment, six third leg portions 37b are provided. Further, at the time of assembling the attachment portion 30, the third leg portion 37b is disposed so as to be positioned between the adjacent first leg portion 33b and second leg portion 35b when viewed from the z direction.

The protruding portion 37c extending upward in the z direction is provided on a peripheral edge of the third flat portion hole 37a1. The protruding portion 37c has a hollow cylindrical shape and has a lower surface opened. A third protruding portion hole 37c1 is provided on an upper surface of the protruding portion 37c. The third protruding portion hole 37c1 is constituted with a round hole through which the first shaft portion 31b of the first fastening portion 31 passes.

(Second Fastening Portion 39)

The second fastening portion 39 is a nut and includes the grip portion 39a, a flange portion 39b, and the first bearing portion 39c.

The grip portion 39a is a portion that is rotated directly or indirectly using a tool by a worker for attachment, or the like, so as to be screwed with the first fastening portion 31.

The flange portion 39b is provided between the grip portion 39a and the first bearing portion 39c and has an xy cross-section larger than that of the grip portion 39a, the first attachment hole 21, and the second attachment hole 81. The flange portion 39b comes into contact with a lower surface of the holding plate 20 when the device for vehicle 1 is attached to the bracket 80 and functions as a stopper so that the attachment portion 30 is not excessively inserted into the first attachment hole 21. When the device for vehicle 1 is attached to the bracket 80, the flange portion 39b and the claw portion 33c of the claw washer 33 sandwich the holding plate 20 and the bracket 80.

The first bearing portion 39c is inserted into a recess portion of the protruding portion 37c of the holder 37, and a first screw hole 39c1 into which the first shaft portion 31b of the first fastening portion 31 is to be inserted is provided near the center of an xy plane. The first screw hole 39c1 may be provided only in the first bearing portion 39c or may be provided continuously in the flange portion 39b and the grip portion 39a.

(Material Constituting Each Portion)

Members of the attachment portion 30 except the holder 37 are constituted with metals. The holder 37 may be constituted with a resin. The holding plate 20, the vehicle roof 70, and the bracket 80 are constituted with metals. However, when grounding of the electronic equipment 10 is not taken into consideration, the holding plate 20 and the attachment portion 30 may be constituted with a resin.

(Bracket 80 of Vehicle Roof 70)

The bracket 80 is a metal plate provided on a vehicle interior side of the vehicle roof 70 and includes a vehicle contact portion 80a, an arm portion 80b, and the in-vehicle antenna device contact portion 80c (see FIG. 1). Two brackets 80 are provided, one for holding a front side of the holding plate 20 in the x direction and the other for holding a rear side of the holding plate 20 in the x direction.

The vehicle contact portion 80a comes into contact with the vehicle roof 70. The arm portion 80b extends obliquely downward from the vehicle contact portion 80a. The in-vehicle antenna device contact portion 80c extends in a horizontal direction from a lower end of the arm portion 80b and is constituted with a surface substantially perpendicular to the z direction. The holding plate 20 is attached to the in-vehicle antenna device contact portion 80c via the attachment portion 30. One set of the arm portion 80b and the in-vehicle antenna device contact portion 80c is provided on each of a right side in the y direction and a left side in the y direction for one bracket 80. One of the in-vehicle antenna device contact portions 80c is provided with the second attachment hole 81 into which the attachment portion 30 is to be inserted. The xy cross-section of the second attachment hole 81 has a cross-sectional shape other than a perfect circle, such as a polygon and an ellipse so that the fitted third flat portion 37a does not rotate about an axis parallel to the z direction. In the first embodiment, an example will be described in which the xy cross-section of the second attachment hole 81 has a quadrangular shape having substantially the same size as the xy cross-section of the first attachment hole 21 and the xy cross-section of an outer shape of the third flat portion 37a.

In the first embodiment, no attachment hole is provided in the other of the in-vehicle antenna device contact portions 80c. However, the other of the in-vehicle antenna device contact portions 80c may be provided with an attachment hole for clipping the holding plate 20 and the in-vehicle antenna device contact portion 80c. In this case, an attachment hole for clipping is also provided in the holding plate 20.

(Attachment Procedure)

Next, procedure for attaching the device for vehicle 1 to the bracket 80 using the attachment portion 30 will be described.

The electronic equipment 10 is assembled in advance and attached to the holding plate 20.

In addition, the attachment portion 30 is assembled in advance. Assembling the attachment portion 30 is performed as follows. The connection portion 35 is sandwiched between the claw washer 33 and the holder 37. A lower end of the first leg portion 33b of the claw washer 33 is fitted into the leg receiving portion 37a2 of the holder 37. The first fastening portion 31 and the second fastening portion 39 sandwich them in above mentioned state. The first fastening portion 31 is attached to the second fastening portion 39 by screwing. However, screwing of the first fastening portion 31 and the second fastening portion 39 is not complete fastening, but temporary fastening that can maintain a state in which the first leg portion 33b of the claw washer 33, the second leg portion 35b of the connection portion 35, and the third leg portion 37b of the holder 37 are fitted to each other. Thus, at this stage, the second leg portion 35b is not bent.

First, the worker for attachment holds the holding plate 20 and brings the holding plate 20 close to the bracket 80 from below in the z direction such that the first attachment hole 21 of the holding plate 20 and the second attachment hole 81 of the bracket 80 face each other in the z direction. Next, the worker for attachment inserts the attachment portion 30 into the first attachment hole 21 and the second attachment hole 81 from below in the z direction while holding the holding plate 20 from below in the z direction (insertion step, see FIG. 4 to FIG. 7). Specifically, a region including the first fastening portion 31, the claw washer 33, the connection portion 35, the holder 37, and the first bearing portion 39c of the attachment portion 30 is inserted into the first attachment hole 21 and the second attachment hole 81 from below in the z direction (from one side of the bracket 80). With such insertion, the first fastening portion 31 and the claw washer 33 are positioned on the other side of the bracket 80. In a case where the holding plate 20 and the bracket 80 are provided with the attachment holes for clipping, clipping is performed before the insertion step.

Figure 9:
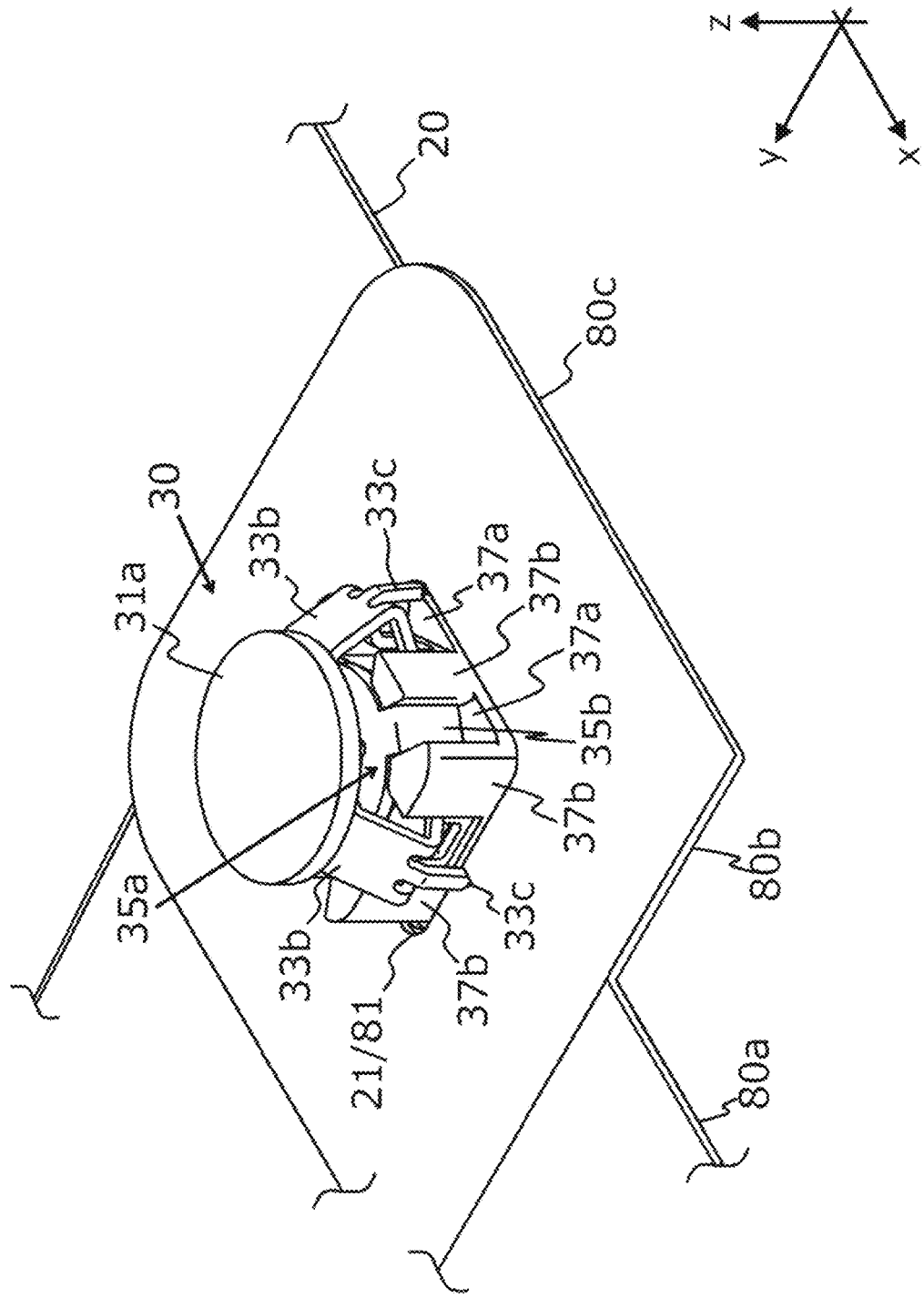
FIG. 9 is a perspective view of the region including the attachment portion in the state in which the first rotation step is executed.
Figure 10:
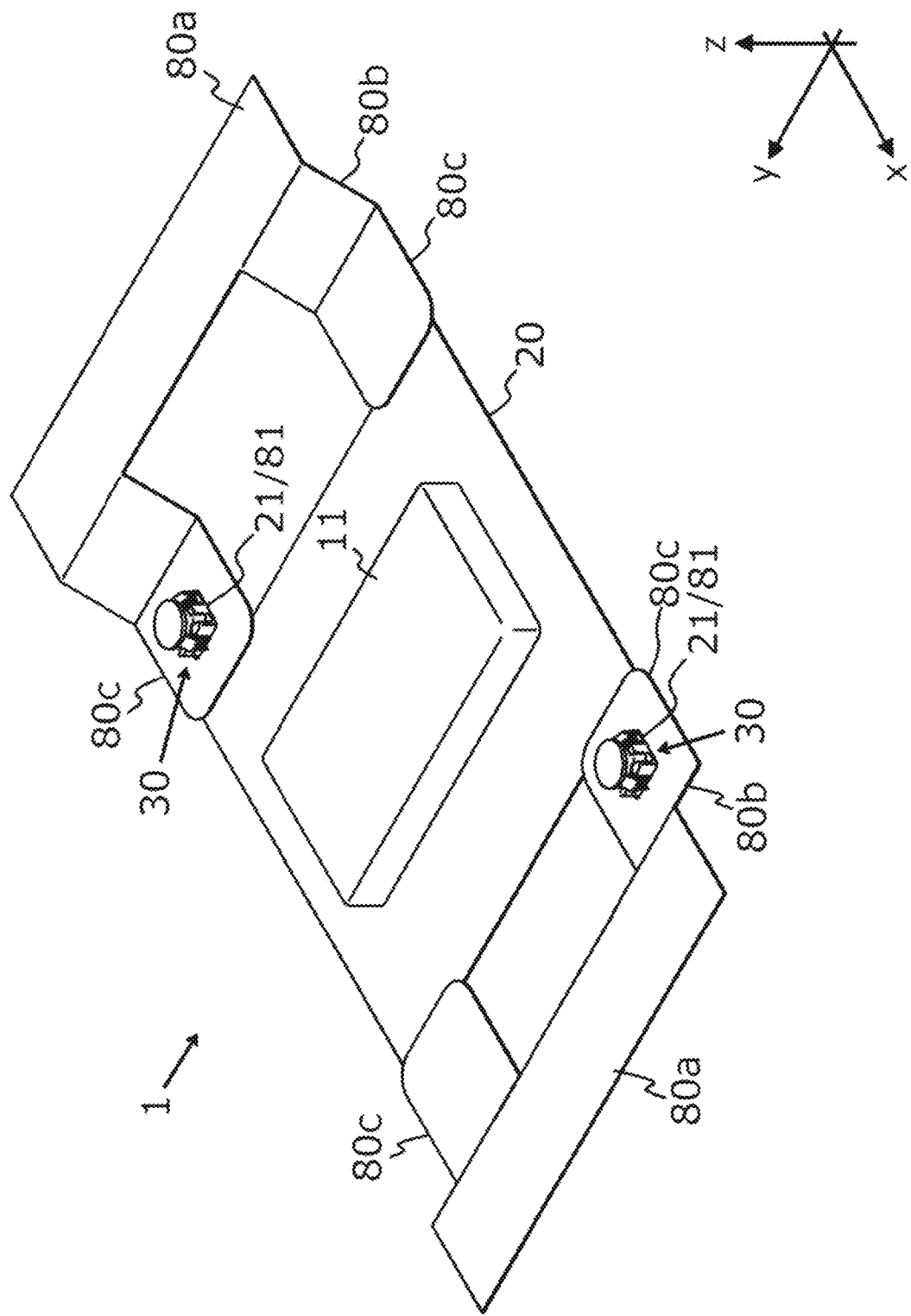
FIG. 10 is a perspective view of the bracket and the device for vehicle in a state in which a first rotation step is executed.

After the insertion, the worker for attachment rotates the grip portion 39a of the second fastening portion 39 in a fastening direction from below in the z direction (from one side of the bracket 80) to bring the first fastening portion 31 and the second fastening portion 39 close to each other (first rotation step, see FIG. 8 to FIG. 10).

The first engagement portion 31c of the first fastening portion 31 is engaged with the second engagement portion 35a2 of the connection portion 35. The second leg portion 35b of the connection portion 35 and the third leg portion 37b of the holder 37 are engaged with each other. The third flat portion 37a of the holder 37 is fitted into the first attachment hole 21 and the second attachment hole 81. The connection portion 35 and the holder 37 function as the detent portion of the first fastening portion 31 and the rotation of the first fastening portion 31 together with the grip portion 39a is suppressed in a case where the grip portion 39a of the second fastening portion 39 is rotated in the fastening direction. In other words, the second fastening portion 39 is rotated in a state where the first fastening portion 31 does not rotate. Thus, when the grip portion 39a is rotated in the fastening direction, the first fastening portion 31 is moved downward in the z direction. When the first fastening portion 31 moves downward in the z direction, a force for sandwiching the first leg portion 33b of the claw washer 33 sandwiched between the first fastening portion 31 and the holder 37 in the vertical direction is applied. Accordingly, the claw washer 33 is bent at the bent portion 33b1. The claw portion 33c protrudes radially outward of the first shaft portion 31b and is brought close to an upper surface of the bracket 80.

Figure 12:
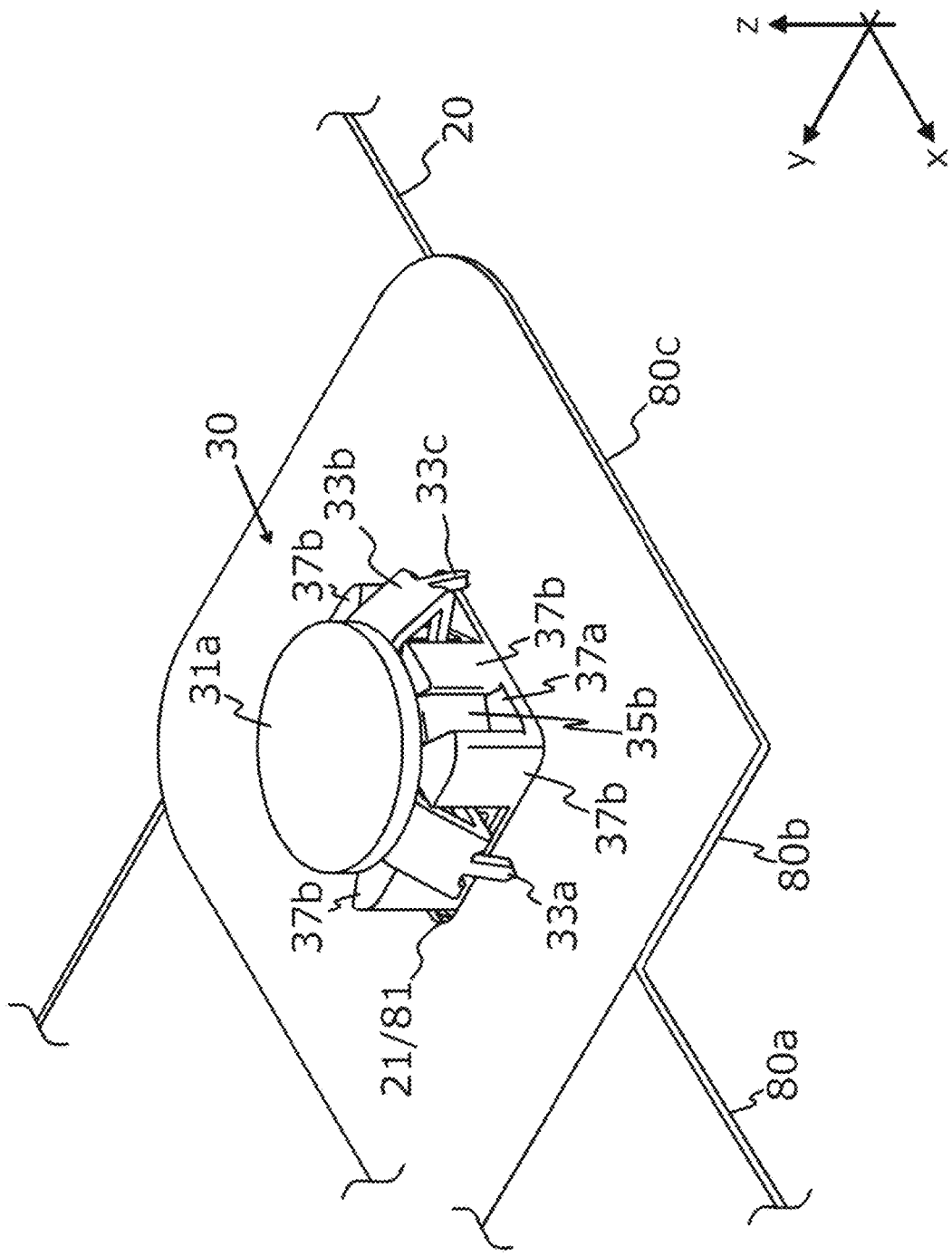
FIG. 12 is a perspective view of the region including the attachment portion in the state in which a second rotation step is executed.
Figure 13:
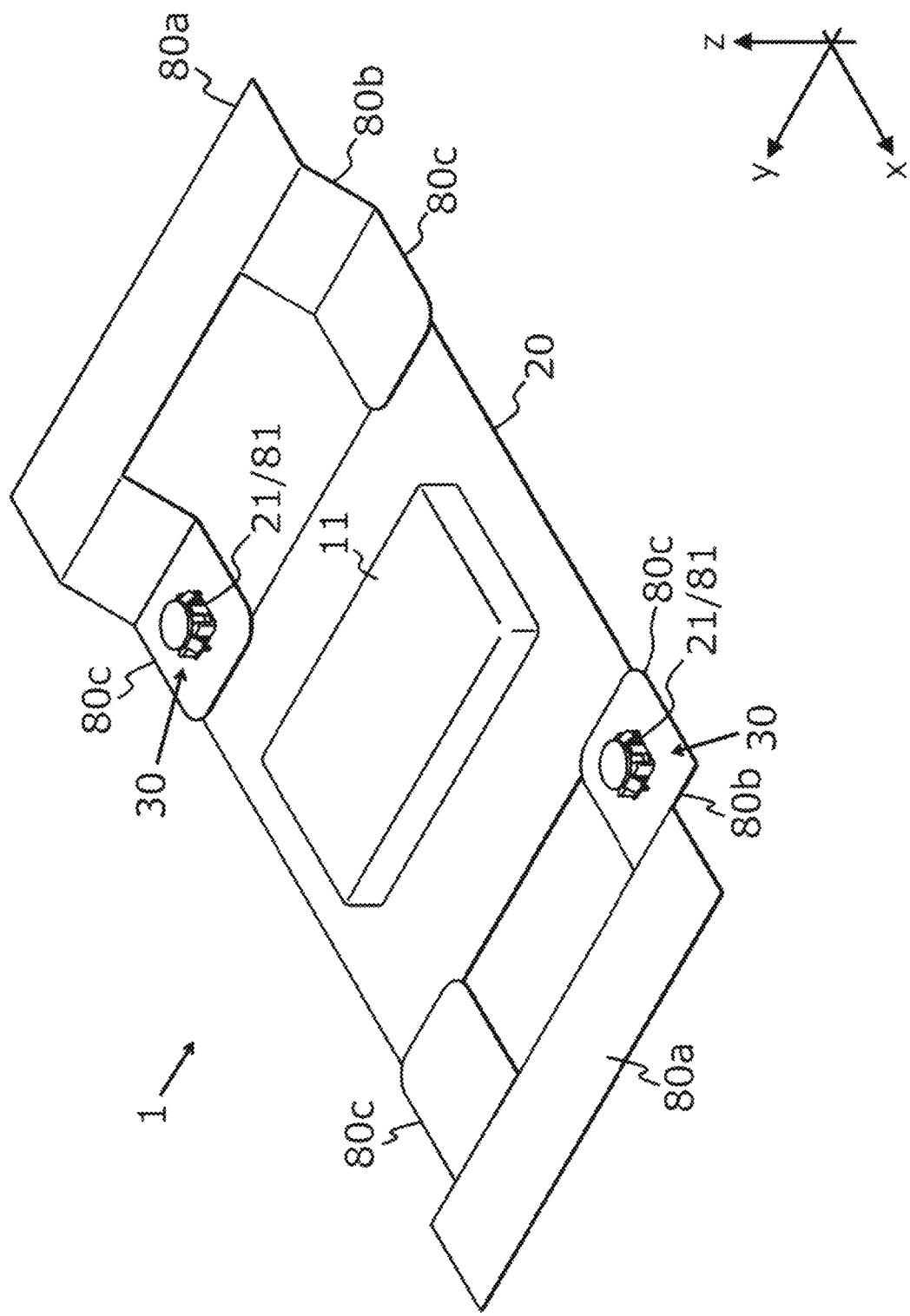
FIG. 13 is a perspective view of the bracket and the device for vehicle in a state in which a second rotation step is executed.

Following the first rotation step, the worker for attachment further rotates the grip portion 39a of the second fastening portion 39 in the fastening direction from below in the z direction (from one side of the bracket 80) to bring the first fastening portion 31 and the second fastening portion 39 closer (second rotation step, see FIG. 11 to FIG. 13). In order to facilitate understanding of deformation of the claw washer 33, the rotation step will be described separately as the first rotation step and the second rotation step, but in an actual operation process, the first rotation step and the second rotation step are continuously performed. The first fastening portion 31 is further moved downward in the z direction, and the lower end portion of the claw portion 33c bites into the upper surface of the bracket 80. As a result, it becomes in a state in which the claw washer 33 from the other side of the bracket 80 and the flange portion 39b of the second fastening portion 39 from one side of the bracket 80 sandwich the holding plate 20 and the bracket 80 in the z direction. In other words, it becomes in a state in which the attachment portion 30 is attached to the bracket 80, and the holding plate 20 is attached to the bracket 80 via the attachment portion 30. When the lower end portion of the claw portion 33c bites into the upper surface of the bracket 80, the electronic equipment 10 is electrically connected to the bracket 80 via the holding plate 20, the first fastening portion 31, the second fastening portion 39, and the claw washer 33.

In the first embodiment, it is suppressed that the first fastening portion 31 rotates along with the rotation of the second fastening portion 39 when the device for vehicle 1 is attached to the bracket 80, by engagement between the first engagement portion 31c of the first fastening portion 31 and the second engagement portion 35a2 of the connection portion 35, fitting between the first leg portion 33b of the claw washer 33 and the third leg portion 37b of the holder 37, fitting between the second leg portion 35b of the connection portion 35 and the third leg portion 37b of the holder 37, fitting between the third flat portion 37a of the holder 37 and the first attachment hole 21, and fitting between the third flat portion 37a of the holder 37 and the second attachment hole 81.

(Effect of Attachment Using Attachment Portion 30 Including Detent Portion)

The second fastening portion 39 is screwed with the first fastening portion 31 whose rotation is suppressed by the detent portion (the connection portion 35, the holder 37), or the like. By the screwing, the claw washer 33 is deformed, and sandwiches the holding plate 20 and the bracket 80 with the second fastening portion 39. By such sandwiching, the attachment portion 30 is fixed to the bracket 80. In other words, inserting the first fastening portion 31 or the like and rotating (fastening) the second fastening portion 39 can be performed from one side of the bracket 80. This can improve workability of attachment as compared with a mode in which the insertion step and the rotation step are performed from both sides. In particular, even in a state where the side (upper side) of the bracket 80 on which the first fastening portion 31 is located is not visible, it becomes possible to fix the attachment portion 30 to the bracket 80 and to fix the holding plate 20 provided between the attachment portion 30 and the bracket 80 to the bracket 80 only by rotating the second fastening portion 39. Thus, the attachment portion 30 or the like, can be easily attached to an attachment object.

(Application Example of Unevenness of Engagement Portion)

In the first embodiment, the first engagement portion 31c is constituted so as to be recessed from the side surface of the first shaft portion 31b, and the second engagement portion 35a2 is constituted so as to protrude radially inward of the first shaft portion 31b from the peripheral edge of the round hole of the second flat portion hole 35a1. However, the first engagement portion 31c may be constituted so as to protrude from the side surface of the first shaft portion 31b, and the second engagement portion 35a2 may be constituted so as to be recessed radially outward of the first shaft portion 31b from the peripheral edge of the round hole of the second flat portion hole 35a1. In this case, the first flat portion hole 33a1 of the claw washer 33 is also provided with an engagement portion that engages with the first engagement portion 31c.

(Configurations of Connection Portion 35 and Holder 37)

Figure 14:
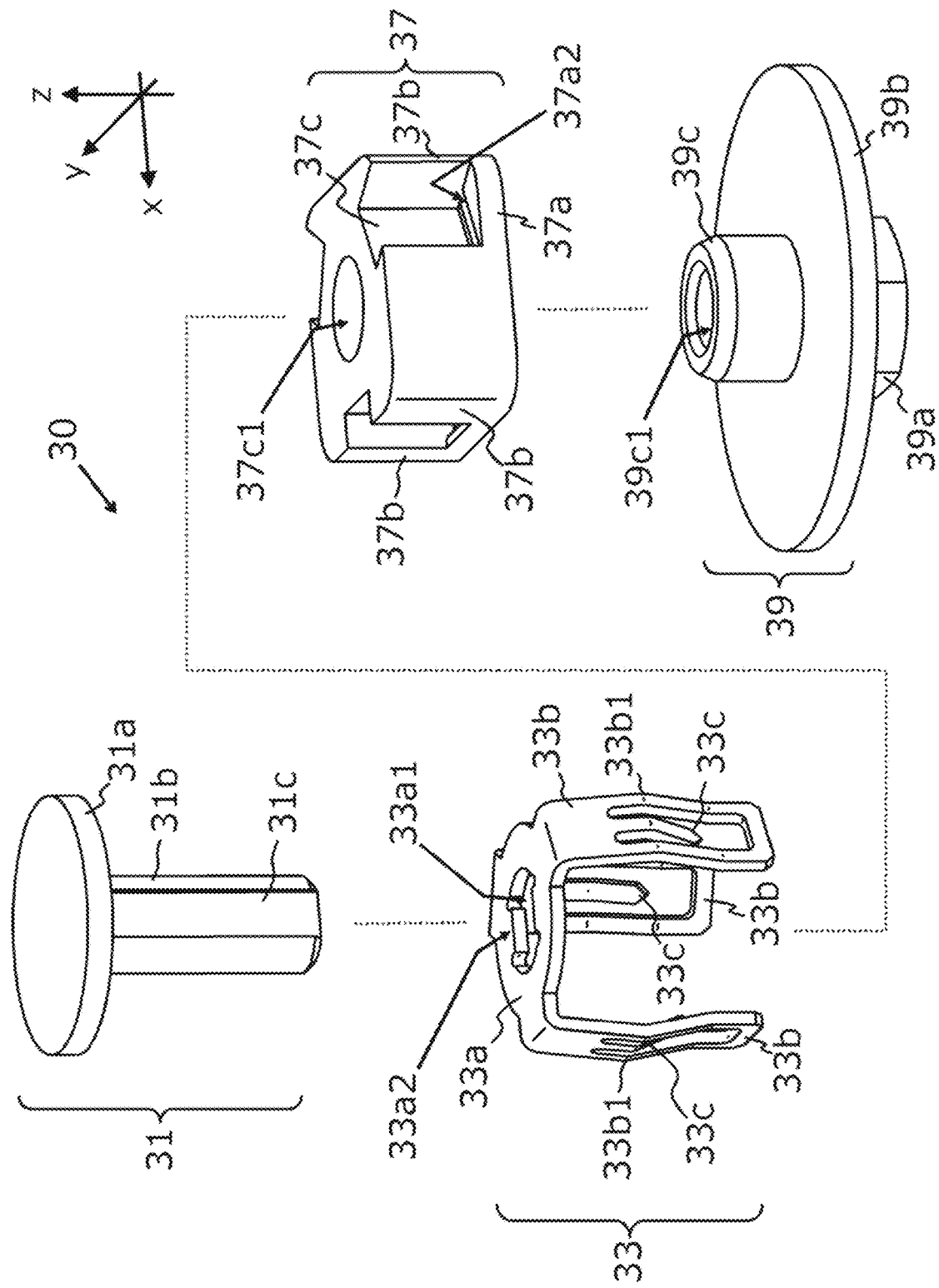
FIG. 14 is an exploded perspective view of an attachment portion of a second embodiment.

In the first embodiment, an example in which the connection portion 35 and the holder 37 are separately constituted has been described. In this case, the connection portion 35 to be engaged with the first engagement portion 31c of the first fastening portion 31 can be constituted with a metal, and the holder 37 can be constituted with a material different from the material of the connection portion 35 (for example, a resin). However, the connection portion 35 and the holder 37 may be integrally constituted. For example, in a second embodiment (see FIG. 14) and a third embodiment (see FIG. 15) which will be described later, an example will be described in which the holder 37 also includes a portion corresponding to the connection portion 35.

(Application Example in which Connection Portion 35 is Omitted)

In the first embodiment, an example in which a member to be engaged with the first engagement portion 31c of the first fastening portion 31 is provided in the connection portion 35 in order to prevent rotation of the first fastening portion 31 has been described. However, the member to be engaged with the first engagement portion 31c of the first fastening portion 31 may be provided in the claw washer 33 (see the second embodiment, FIG. 14). In this case, a third engagement portion 33a2 corresponding to the second engagement portion 35a2 of the first embodiment is provided in the first flat portion hole 33a1 of the first flat portion 33a of the claw washer 33.

In other words, the first flat portion hole 33a1 of the first flat portion 33a of the claw washer 33 is penetrated by the first shaft portion 31b of the first fastening portion 31 and is engaged with the first engagement portion 31c of the first shaft portion 31b, at the time of assembling the attachment portion 30. Thus, the first flat portion hole 33a1 has a shape in which the third engagement portion 33a2 is provided in the round hole. The third engagement portion 33a2 includes a convex portion protruding radially inward of the first shaft portion 31b so as to correspond to the recess of the first engagement portion 31c from the peripheral edge of said round hole.

In the second embodiment, two third engagement portions 33a2 are provided so as to face each other in the y direction in accordance with the first engagement portion 31c.

In this case, the holder 37 can be integrally constituted including a portion corresponding to the connection portion 35.

In the second embodiment, it is suppressed that the first fastening portion 31 rotates along with the rotation of the second fastening portion 39 when the device for vehicle 1 is attached to the bracket 80, by engagement between the first engagement portion 31c of the first fastening portion 31 and the third engagement portion 33a2 of the claw washer 33, fitting between the first leg portion 33b of the claw washer 33 and the third leg portion 37b of the holder 37, fitting between the third flat portion 37a of the holder 37 and the first attachment hole 21, and fitting between the third flat portion 37a of the holder 37 and the second attachment hole 81.

In place of or in addition to engagement between the first engagement portion 31c of the first fastening portion 31 and the third engagement portion 33a2 of the claw washer 33, the first fastening portion 31 and the claw washer 33 may be fixed by welding, or the like.

(Application Example in which Bolt and Nut are Reversed)

In the first embodiment and the second embodiment, an example in which the first fastening portion 31 is a bolt and the second fastening portion 39 is a nut has been described. However, the first fastening portion 31 may be a nut, and the second fastening portion 39 may be a bolt (see the third embodiment, FIG. 15).

The first fastening portion 31 of the third embodiment is provided with a second bearing portion 31d corresponding to the first bearing portion 39c of the second fastening portion 39 of the first embodiment. The second bearing portion 31d is provided with a second screw hole 31d1 corresponding to the first screw hole 39c1 of the first bearing portion 39c of the first embodiment. The second fastening portion 39 of the third embodiment is provided with the grip portion 39a corresponding to the head portion 31a of the first fastening portion 31 of the first embodiment, the flange portion 39b, and a second shaft portion 39d corresponding to the first shaft portion 31b of the first fastening portion 31 of the first embodiment. The second bearing portion 31d of the third embodiment is fixed to the first flat portion 33a of the claw washer 33 by welding, or the like. In FIG. 15, a welded portion 31e between the second bearing portion 31d and the first flat portion 33a is indicated in black.

In the third embodiment, it is suppressed that the first fastening portion 31 rotates along with rotation of the second fastening portion 39 when the device for vehicle 1 is attached to the bracket 80, by fixing of the first fastening portion 31 and the claw washer 33 by welding, or the like, fitting between the first leg portion 33b of the claw washer 33 and the third leg portion 37b of the holder 37, fitting between the third flat portion 37a of the holder 37 and the first attachment hole 21, and fitting between the third flat portion 37a of the holder 37 and the second attachment hole 81.

(Application Example to Devices Other than Antenna Device)

In the first to third embodiments, an example has been described where the device for vehicle 1 is an antenna device for vehicle, and the electronic equipment 10 is an antenna unit.

However, the device for vehicle 1 is not limited to these configurations. For example, it is conceivable that the electronic equipment 10 is a signal processing unit that processes data.

(Application Example of Holding Plate 20 and Holder 37)

In addition, in the first to third embodiments, an example in which the holding plate 20 and the holder 37 are separately constituted has been described. However, the holder 37 may be integrally formed with the holding plate 20.

(Application Example of Arrangement of Holding Plate 20)

In the first to third embodiments, an example has been described in which the holding plate 20 is constituted with a surface substantially perpendicular to the z direction, and the holding plate 20 is attached to the bracket 80 from below in the z direction. However, the holding plate 20 may be constituted with a surface perpendicular to the x direction or the y direction, and the holding plate 20 may be attached to the bracket 80 from the horizontal direction.

Although some embodiments of the present invention have been described, these embodiments have been presented as examples and are not intended to limit the scope of the invention. These embodiments can be implemented in various other forms, and various omissions, substitutions, and changes can be made without departing from the gist of the invention. These embodiments and modifications thereof are included in the scope and gist of the invention and are included in the invention described in the claims and the equivalent scope thereof.

According to the present specification, the following aspects are provided.

(Aspect 1)

An attachment portion includes a first fastening portion, a second fastening portion to be screwed with the first fastening portion, a detent portion provided between the first fastening portion and the second fastening portion, and a deformable member provided between the first fastening portion and the detent portion. The detent portion suppresses that at least one of the first fastening portion and the deformable member rotate(s) when the second fastening portion rotates. After the first fastening portion and the deformable member are inserted into an attachment hole into which the attachment portion is to be inserted, of an attachment object, the deformable member sandwiches the attachment object with the second fastening portion by rotating the second fastening portion so as to be screwed with the first fastening portion.

According to aspect 1, the second fastening portion is screwed with the first fastening portion whose rotation is suppressed by the detent portion, or the like. By the screwing, the deformable member is deformed, and sandwiches the attachment object with the second fastening portion. By such sandwiching, the attachment portion is fixed to the attachment object. In other words, inserting the first fastening portion or the like, and rotating (fastening) the second fastening portion can be performed from one side of the attachment object. Even in a state where a side of the attachment object on which the first fastening portion is located is not visible, it becomes possible to fix the attachment portion to the attachment object only by rotating the second fastening portion. Thus, the attachment portion or the like, can be easily attached to the attachment object.

(Aspect 2)

Preferably, the deformable member is a claw washer. A claw portion of the claw washer comes into contact with the attachment object by movement of the first fastening portion along with rotation of the second fastening portion. This enables attachment to the attachment object more reliably than attachment using a washer without a claw.

(Aspect 3)

More preferably, the detent portion includes a holder that holds the claw washer. The holder is has a region in contact with an inner wall of an attachment hole which is provided in the attachment object and into which the attachment portion is to be inserted. The attachment hole and the region in contact with the attachment hole of the holder have a cross-sectional shape other than a perfect circle.

(Aspect 4)

More preferably, the second fastening portion includes a flange portion. The flange portion has a larger cross-section than a cross-section of the attachment hole. The flange portion and the deformable member sandwich the attachment object.

(Aspect 5)

More preferably, the first fastening portion is a bolt. The second fastening portion is a nut. A shaft portion of the bolt is provided with an engagement portion that engages with at least one of the detent portion and the deformable member.

(Aspect 6)

Preferably, the first fastening portion is fixed to the claw washer.

(Aspect 7)

A device for vehicle includes electronic equipment, an electronic equipment holding portion that holds the electronic equipment, and an attachment portion for attaching the electronic equipment holding portion to a bracket of a vehicle. The electronic equipment holding portion includes a first attachment hole into which the attachment portion is to be inserted. The bracket includes a second attachment hole into which the attachment portion is to be inserted at a position overlapping with the first attachment hole. The attachment portion includes a first fastening portion, a second fastening portion to be screwed with the first fastening portion, a detent portion, and a deformable member. The detent portion is provided between the first fastening portion and the second fastening portion and suppresses that at least one of the first fastening portion and the deformable member rotate(s) when the second fastening portion rotates. The deformable member is provided between the first fastening portion and the detent portion. After the first fastening portion and the deformable member are inserted into the first attachment hole and the second attachment hole, the deformable member sandwiches the electronic equipment holding portion and the bracket with the second fastening portion by rotating the second fastening portion so as to be screwed with the first fastening portion According to aspect 7, the second fastening portion is screwed with the first fastening portion whose rotation is suppressed by the detent portion, or the like. By the screwing, the deformable member is deformed, and sandwiches the attachment object with the second fastening portion. By such sandwiching, the attachment portion is fixed to the attachment object. In other words, inserting the first fastening portion or the like and rotating (fastening) the second fastening portion can be performed from one side of the attachment object. Even in a state where the side of the attachment object on which the first fastening portion is located is not visible, it becomes possible to fix the attachment portion to the attachment object and to fix the electronic equipment holding portion provided between the attachment portion and the attachment object to the attachment object only by rotating the second fastening portion. Thus, the attachment portion or the like, can be easily attached to the attachment object.

(Aspect 8)

Preferably, the electronic equipment is electrically connected to the bracket via the electronic equipment holding portion and the attachment portion by the screwing.

(Aspect 9)

An attachment method is a method of attaching an attachment portion to an attachment object, the attachment portion including a first fastening portion, a second fastening portion to be screwed with the first fastening portion, a detent portion provided between the first fastening portion and the second fastening portion, and a deformable member provided between the first fastening portion and the detent portion. The attachment method includes: an insertion step of inserting the first fastening portion and the deformable member into an attachment hole of the attachment object; and a rotation step of rotating the second fastening portion so as to be screwed with the first fastening portion. By the rotation step, the detent portion suppresses rotation of at least one of the first fastening portion and the deformable member, and the deformable member sandwiches the attachment object with the second fastening portion.

(Aspect 10)

An attachment method is a method of attaching an electronic equipment holding portion that holds electronic equipment to a bracket of a vehicle by an attachment portion including a first fastening portion, a second fastening portion to be screwed with the first fastening portion, a detent portion provided between the first fastening portion and the second fastening portion, and a deformable member provided between the first fastening portion and the detent portion. A device for vehicle includes the electronic equipment, the electronic equipment holding portion that holds the electronic equipment, and the attachment portion for attaching the electronic equipment holding portion to the bracket of the vehicle. The attachment method includes: an insertion step of inserting the first fastening portion and the deformable member into a first attachment hole provided in the electronic equipment holding portion and a second attachment hole provided in the bracket of the vehicle; and a rotation step of rotating the second fastening portion so as to be screwed with the first fastening portion. By the rotation step, the detent portion suppresses rotation of at least one of the first fastening portion and the deformable member, and the deformable member sandwiches the electronic equipment holding portion and the bracket with the second fastening portion.

(Aspect 11)

An attachment method is a method of attaching an attachment portion to an attachment object, the attachment portion including a first fastening portion, a second fastening portion to be screwed with the first fastening portion, and a deformable member provided between the first fastening portion and the second fastening portion. The attachment method includes: an insertion step of inserting the first fastening portion and the deformable member into an attachment hole of the attachment object from one side of the attachment object and positioning the first fastening portion and the deformable member on the other side of the attachment object; and a rotation step of rotating the second fastening portion from one side so as to be screwed with the first fastening portion in a state where the first fastening portion does not rotate. By the rotation step, the deformable member sandwiches the attachment object from the other side with the second fastening portion on the one side.

REFERENCE SIGNS LIST

1 Device for vehicle
10 Electronic equipment
11 Case
20 Holding plate (electronic equipment holding portion)
21 First attachment hole
30 Attachment portion
31 First fastening portion (bolt or nut)
31a Head portion
31b First shaft portion
31c First engagement portion
31d Second bearing portion
31d1 Second screw hole
31e Welded portion
33 Claw washer (deformable member)
33a First flat portion
33a1 First flat portion hole
33a2 Third engagement portion
33b First leg portion
33b1 Bent portion
33c Claw portion
35 Connection portion
35a Second flat portion
35a1 Second flat portion hole
35a2 Second engagement portion
35b Second leg portion
37 Holder
37a Third flat portion
37a1 Third flat portion hole
37a2 Leg receiving portion
37b Third leg portion
37c Protruding portion
37c1 Third protrusion hole
39 Second fastening portion (nut or bolt)
39a Grip portion
39b Flange portion
39c First bearing portion
39c1 First screw hole
39d Second shaft portion
70 Vehicle roof
80 Bracket
80a Vehicle contact portion
80b Arm portion
80c In-vehicle antenna device contact portion
81 Second attachment hole

The invention claimed is:

1. An attachment portion that is attached to an attachment hole of an attachment object, the attachment portion comprising:
a first fastening portion having a shaft portion;
a second fastening portion to be screwed with the first fastening portion;
a deformable member positioned between the first fastening portion and the second fastening portion; and
a detent portion that suppresses a rotation of at least one of the first fastening portion or the deformable member, wherein the shaft portion is provided with an engagement portion that engages with at least one of the detent portion or the deformable member, and the deformable member and the second fastening portion sandwich the attachment object by inserting the first fastening portion and the deformable member into the attachment hole from one side of the attachment object and screwing the second fastening portion from the one side.

2. The attachment portion according to claim 1, wherein the deformable member is a claw washer, and a claw portion of the claw washer comes into contact with the attachment object.

3. The attachment portion according to claim 2, wherein the detent portion includes a holder that holds the claw washer,
the holder has a region in contact with an inner wall of the attachment hole, and
the attachment hole and the region of the holder in contact with the attachment hole have a cross-sectional shape other than a perfect circle.

4. The attachment portion according to claim 3, wherein the second fastening portion includes a flange portion,
the flange portion has a larger cross-section than a cross-section of the attachment hole, and
the flange portion and the deformable member sandwich the attachment object.

5. The attachment portion according to claim 1, wherein the first fastening portion is a bolt, and
the second fastening portion is a nut.

6. The attachment portion according to claim 2, wherein the first fastening portion is fixed to the claw washer.

7. A device for vehicle comprising:
electronic equipment;
an electronic equipment holding portion that holds the electronic equipment; and
an attachment portion for attaching the electronic equipment holding portion to a metal body of a vehicle,
wherein the electronic equipment holding portion includes a first attachment hole into which the attachment portion is to be inserted,
the metal body includes a second attachment hole into which the attachment portion is to be inserted at a position overlapping with the first attachment hole,
the attachment portion includes a first fastening portion having a shaft portion, a second fastening portion to be screwed with the first fastening portion, a deformable member, and a detent portion,
the deformable member is positioned between the first fastening portion and the second fastening portion,
the detent portion suppresses that at least one of the first fastening portion or the deformable member rotate(s),
the shaft portion is provided with an engagement portion that engages with at least one of the detent portion or the deformable member, and
the deformable member and the second fastening portion sandwich the electronic equipment holding portion and the metal body by inserting the first fastening portion and the deformable member into the attachment hole and the second attachment hole from one side of the metal body and screwing the second fastening portion from the one side.

8. The device for vehicle according to claim 7, wherein the electronic equipment is electrically connected to the metal body via the electronic equipment holding portion and the attachment portion by the screwing.

9. An attachment method that is a method of attaching an attachment portion to an attachment object, the attachment portion including a first fastening portion whose shaft portion is provided with an engagement portion, a second fastening portion to be screwed with the first fastening portion, a deformable member positioned between the first fastening portion and the second fastening portion, and a detent portion, the engagement portion engaging with at least one of the detent portion or the deformable member, the attachment method comprising:

an insertion step of inserting the first fastening portion and the deformable member into an attachment hole of the attachment object from one side of the attachment object; and a rotation step of rotating the second fastening portion from the one side, wherein by the rotation step, the detent portion suppresses rotation of at least one of the first fastening portion or the deformable member, and the deformable member and the second fastening portion sandwich the attachment object.

10. An attachment method that is a method of attaching an electronic equipment holding portion that holds electronic equipment to a metal body of a vehicle by an attachment portion including a first fastening portion whose shaft portion is provided with an engagement portion, a second fastening portion to be screwed with the first fastening portion, a deformable member positioned between the first fastening portion and the second fastening portion, and a detent portion, the engagement portion engaging with at least one of the detent portion or the deformable member, the attachment method comprising:

an insertion step of inserting the first fastening portion and the deformable member into a first attachment hole provided in the electronic equipment holding portion and a second attachment hole provided in a metal body of the vehicle from one side of the metal body; and a rotation step of rotating the second fastening portion from the one side, wherein by the rotation step, the detent portion suppresses rotation of at least one of the first fastening portion or the deformable member, and the deformable member and the second fastening portion sandwich the electronic equipment holding portion and the metal body.

11. An attachment method that is a method of attaching an attachment portion to an attachment object, the attachment portion including a first fastening portion whose shaft portion is provided with an engagement portion, a second fastening portion to be screwed with the first fastening portion, and a deformable member positioned between the first fastening portion and the second fastening portion, the engagement portion engaging with the deformable member, the attachment method comprising:

an insertion step of inserting the first fastening portion and the deformable member into an attachment hole of the attachment object from one side of the attachment object and positioning the first fastening portion and the deformable member on the other side of the attachment object; and a rotation step of rotating the second fastening portion from the one side in a state where the first fastening portion does not rotate, wherein by the rotation step, the deformable member on the other side and the second fastening portion on the one side sandwich the attachment object.

* * * * *